United States Patent
Panasik et al.

(10) Patent No.: US 7,762,751 B2
(45) Date of Patent: Jul. 27, 2010

(54) ANCHOR

(75) Inventors: Cheryl L. Panasik, Elburn, IL (US);
Aaron V. Monje, Chicago, IL (US);
David W. Mueller, Lake Zurich, IL (US); John P. Grimm, Santee, CA (US);
Richard J. Ernst, San Diego, CA (US);
Naim Mansour, Villa Park, IL (US)

(73) Assignee: Illinois Tool Works Inc., Glenview, IL (US)

( * ) Notice: Subject to any disclaimer, the term of this patent is extended or adjusted under 35 U.S.C. 154(b) by 525 days.

(21) Appl. No.: 11/754,098

(22) Filed: May 25, 2007

(65) Prior Publication Data
US 2007/0224013 A1 Sep. 27, 2007

Related U.S. Application Data

(63) Continuation-in-part of application No. 11/290,212, filed on Nov. 30, 2005, now abandoned, which is a continuation-in-part of application No. 10/772,677, filed on Feb. 5, 2004, now Pat. No. 7,001,124.

(51) Int. Cl.
*F16B 13/06* (2006.01)
*F16B 13/13* (2006.01)
(52) U.S. Cl. .................. 411/30; 411/80.1; 411/80.6
(58) Field of Classification Search ............ 441/29–31, 441/80.1–80.6, 59, 60.2, 62, 387.1, 387.5
See application file for complete search history.

(56) References Cited

U.S. PATENT DOCUMENTS
3,188,905 A 6/1965 Millet
(Continued)

FOREIGN PATENT DOCUMENTS
DE 43 43 329 6/1995
(Continued)

OTHER PUBLICATIONS
Search report for PCT/US2004/040701.
(Continued)

*Primary Examiner*—Flemming Saether
(74) *Attorney, Agent, or Firm*—Mark W. Croll; Christopher P. Rauch; Beem Patent Law Firm

(57) ABSTRACT

A self-drilling anchor for use in a friable material comprises a body having an axis, a flanged rear end, a drilling front end and a generally cylindrical portion therebetween having an outer surface with a thread disposed thereon, wherein the body forks, beginning at a predetermined distance from the flanged rear end, into a first leg and a second leg, the first leg extending forwardly into a drilling tip, wherein the first leg may have a generally rearward facing shoulder angled obtusely outwardly with respect to the axis, wherein the body has an axial bore for receiving an elongate fastener, the axial bore extending substantially through the flanged end and leading to the generally rearward facing shoulder, wherein the anchor is adapted so that the first leg pivots apart from the second leg when the elongate fastener deflects the generally rearward facing shoulder and the predetermined distance is selected to increase pullout strength when the first leg is pivoted apart from the second leg and the anchor is installed in the friable material.

19 Claims, 3 Drawing Sheets

U.S. PATENT DOCUMENTS

| | | | |
|---|---|---|---|
| 3,413,887 A | | 12/1968 | Von Wolff et al. |
| 3,431,813 A | * | 3/1969 | Johnson ................. 411/61 |
| 3,548,705 A | * | 12/1970 | Nasser ................. 411/80.1 |
| 4,142,440 A | | 3/1979 | Schefer |
| 4,601,625 A | | 7/1986 | Ernst et al. |
| 4,752,170 A | | 6/1988 | McSherry et al. |
| 5,037,257 A | | 8/1991 | Kubic et al. |
| 5,224,805 A | | 7/1993 | Moretti et al. |
| 5,603,593 A | | 2/1997 | Fischer et al. |
| 5,692,864 A | * | 12/1997 | Powell et al. ............. 411/30 |
| 6,139,236 A | | 10/2000 | Ito |
| 6,186,716 B1 | | 2/2001 | West et al. |
| 6,196,780 B1 | | 3/2001 | Wakai et al. |
| 6,354,779 B1 | | 3/2002 | West et al. |
| 6,371,706 B1 | | 4/2002 | Wallace |
| 6,382,892 B1 | | 5/2002 | Hempfling |
| 6,402,448 B1 | | 6/2002 | Dicke |
| 6,494,653 B2 | | 12/2002 | Remmers |
| 6,676,350 B1 | | 1/2004 | McSherry et al. |
| 7,001,124 B2 | * | 2/2006 | Panasik et al. ............ 411/30 |
| 7,144,212 B2 | * | 12/2006 | Kaye et al. ............... 411/30 |
| 7,261,505 B2 | * | 8/2007 | Ernst et al. ............... 411/35 |
| 7,320,569 B2 | * | 1/2008 | Kaye et al. ............... 411/30 |
| 2005/0175429 A1 | | 8/2005 | Panasik et al. |

FOREIGN PATENT DOCUMENTS

| | | |
|---|---|---|
| EP | 0 669 471 | 8/1995 |
| EP | 1 004 781 | 5/2000 |
| EP | 1298331 A2 | 4/2003 |
| GB | 1 487 032 | 7/1975 |
| JP | 58-88217 | 5/1983 |
| JP | 60-245821 | 12/1985 |
| JP | 3000632 | 9/1994 |
| JP | 2002-235715 | 8/2002 |
| WO | WO2005038275 A1 | 4/2005 |
| WO | WO 2006/031421 | 3/2006 |

OTHER PUBLICATIONS

Search report for PCT/US2006/020693.

International Searching Authority, ISA/EP, PCT International Search Report, International Application PCT/US2006/043954, mailing date Aug. 6, 2007.

* cited by examiner

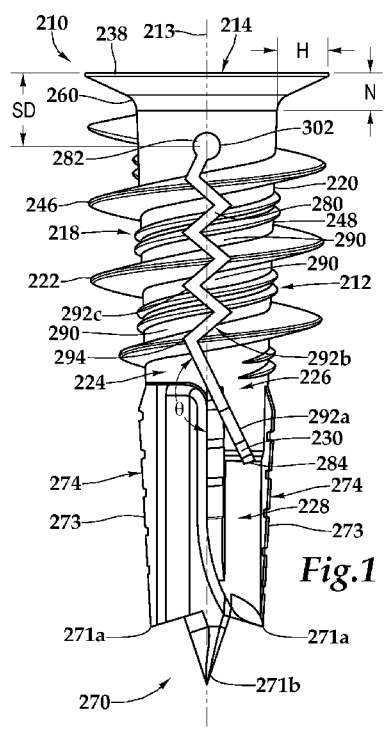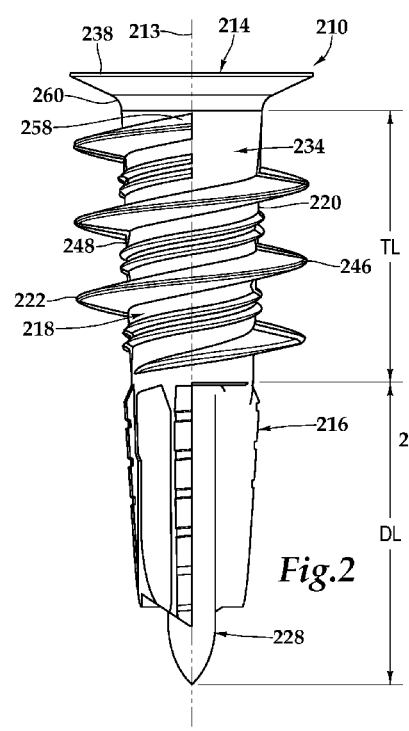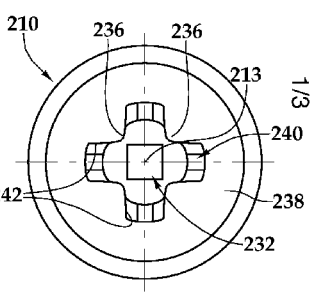

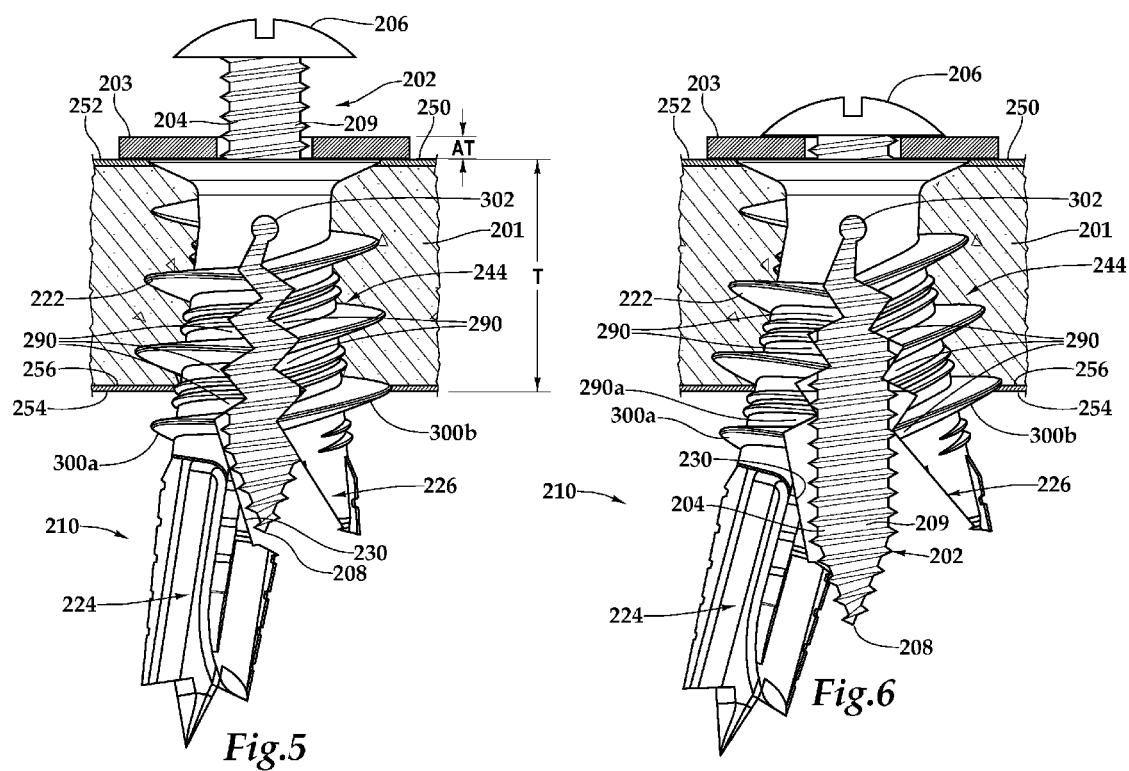

ANCHOR

This application is a continuation-in-part of U.S. patent application Ser. No. 11/290,212 filed on Nov. 30, 2005 now abandoned, which is a continuation-in-part of U.S. patent application Ser. No. 10/772,677 filed on Feb. 5, 2004, now U.S. Pat. No. 7,001,124.

BACKGROUND OF THE INVENTION

1. Field of the Invention

The present invention is directed to an anchor for use in a friable material, particularly to a self-drilling anchor for use in drywall.

2. Description of the Related Art

Because drywall is a friable material, mounting articles thereto can be difficult. In the past, self-drilling anchors have been used. However, self-drilling anchors have been known to achieve a pull-out strength of only about 50 to 70 pounds.

Some prior "splitting" anchors of this general type require a high installation torque for the internal fastener. If the friable surface is excessively hard, the anchor may break during the drywall installation. Also, some current anchors cause drywall to blister around the head, wobble during drilling, and/or offer a poor fit for Phillips drivers. In use, in some current "splitting" anchors, the head does not seat flush or below the drywall surface, and may experience cracking in the area around the Phillips recess. Moreover, most current "splitting" anchor products do not have a thread that, in use, wedges the anchor to the back face of the dry wall, and does not grip an optimal amount of the drywall material.

For heavier loads, toggle bolts have been used. Toggle bolts have been known to be expensive, unreliable and difficult to install because they typically are not self-drilling. In addition, toggle bolts and other heavier duty anchors generally have multiple mechanical steps that occur hidden behind the drywall surface after the fastener head is flush with the head of the anchor, a bar needs to flip and tighten against the back of the drywall, anchor plastic material needs to be knotted up or knurled against the back of the drywall, or a metal "umbrella" stricture needs to be collapsed against the back of the wall, e.g. Because users may believe installation is complete once the fastener is flush with the anchor head, they may not perform these additional steps, resulting in incomplete installation, which may lead to failure of the anchor and damage to mounted property.

Attempts have been made to create self-drilling anchors that are easier to install than toggle bolts, are more reliable than toggle bolts, and generate increased pull-out strength over other self-drilling anchors. While they represent an increase over previous self-drilling anchors, they still exhibit lower strength than toggle bolts. What is needed is an anchor for a friable material that overcomes shortcomings of prior art anchors and provides benefits over toggle bolts and other existing anchors.

BRIEF SUMMARY OF THE INVENTION

A self-drilling anchor is provided for use in a friable material, the anchor comprising a body having an axis, a flanged rear end having torque transmitting surfaces, a drilling front end and, in a drilling mode, a generally cylindrical portion therebetween having an outer surface with a thread having a height sufficient to increase pullout strength disposed thereon, wherein the body forks, beginning at a predetermined distance from the flanged rear end, into a first leg and a second leg, the predetermined distance being selected so as to increase pullout strength of the anchor. The first leg may have a generally rearward facing shoulder angled obtusely outwardly with respect to the axis, wherein the body has an axial bore for receiving an elongate fastener. In another variation, the first leg may extend forwardly into a drilling tip. The axial bore extends substantially through the flanged rear end and may extend substantially through the generally cylindrical portion and lead to the generally rearward facing shoulder. In an additional embodiment, the anchor has a drilling mode wherein the second leg nests behind the generally rearward facing shoulder of the first leg, and is adapted such that the legs are pivoted apart from one another when the elongate fastener deflects the rearward facing shoulder.

The self-drilling anchor may include other aspects, such as the first leg and the second leg being demarcated from one another by a pair of slits beginning at a predetermined distance from the flanged rear end and extending at least partly through the outer surface and the thread of the generally cylindrical portion, wherein the slits are on generally opposite sides of the outer surface. The slits may have a zig-zag shape defining crocodile-like interfacing teeth on the legs. In addition, the anchor is adapted so that the first leg will pivot apart from the second leg when the elongate fastener deflects the generally rearward facing shoulder.

The predetermined distance that separates the slits from the flanged rear end may be a key factor in increasing the pullout strength of the anchor. Increases in strength are observed when this selected distance is between about $1/16$ inch about $3/8$ inch with excellent results observed around 0.189 inches.

In one embodiment, a self-drilling anchor comprises a body having an axis, a flanged rear end, a drilling front end and a generally cylindrical portion therebetween having an outer surface with a thread disposed thereon, wherein said body forks along a pair of zig-zag shaped slits beginning at a predetermined distance from said flanged rear end, into a first leg and a second leg, wherein said zig-zag shaped slits define crocodile-like interfacing teeth on said legs, said first leg having a generally rearward facing shoulder angled obtusely outwardly with respect to said axis, wherein a forwardmost portion of each of said slits follows a perimeter of said generally rearward facing shoulder substantially to a forwardmost and outermost end of said generally rearward facing shoulder, a coaxial central bore in said body for receiving an elongate fastener, said central bore extending substantially through said flanged rear end and said generally cylindrical portion and leading to said generally rearward facing shoulder, wherein said anchor has a drilling mode wherein said second leg nests behind said generally rearward facing shoulder of said first leg, and an anchoring mode wherein said legs are pivoted apart from one another. In a preferred embodiment, said drilling front end has an axially centered point and at least two surrounding points, each surrounding point having a reamer edge surface.

Likewise, the drilling front end of the anchor may have one of several possible drill tips. For example, anchor may have a spade-like drilling tip having either a conical or sharp drill point, a tri-point drilling tip, a drilling tip with a "castle" configuration, a modified gimlet drilling tip, or any other form of self-drilling tip.

These and other features and advantages are evident from the following description of the present invention, with reference to the accompanying drawings.

BRIEF DESCRIPTION OF THE SEVERAL VIEWS OF THE DRAWINGS

FIG. 1 is a side view of a self-drilling anchor in a drilling mode.

FIG. 2 is a plan view of the self-drilling anchor in the drilling mode.

FIG. 3 is an elevation view of a flanged rear end of the self-drilling anchor.

FIG. 5 is a partial side-sectional view of the self-drilling anchor installed in a friable material, wherein the anchor is adapted to have the legs pivot while being engaged by an elongated fastener.

FIG. 6 is a side view of the self-drilling anchor with the elongated fastener pivoting the anchor legs.

DETAILED DESCRIPTION OF THE ILLUSTRATED EMBODIMENTS

Figure 4:
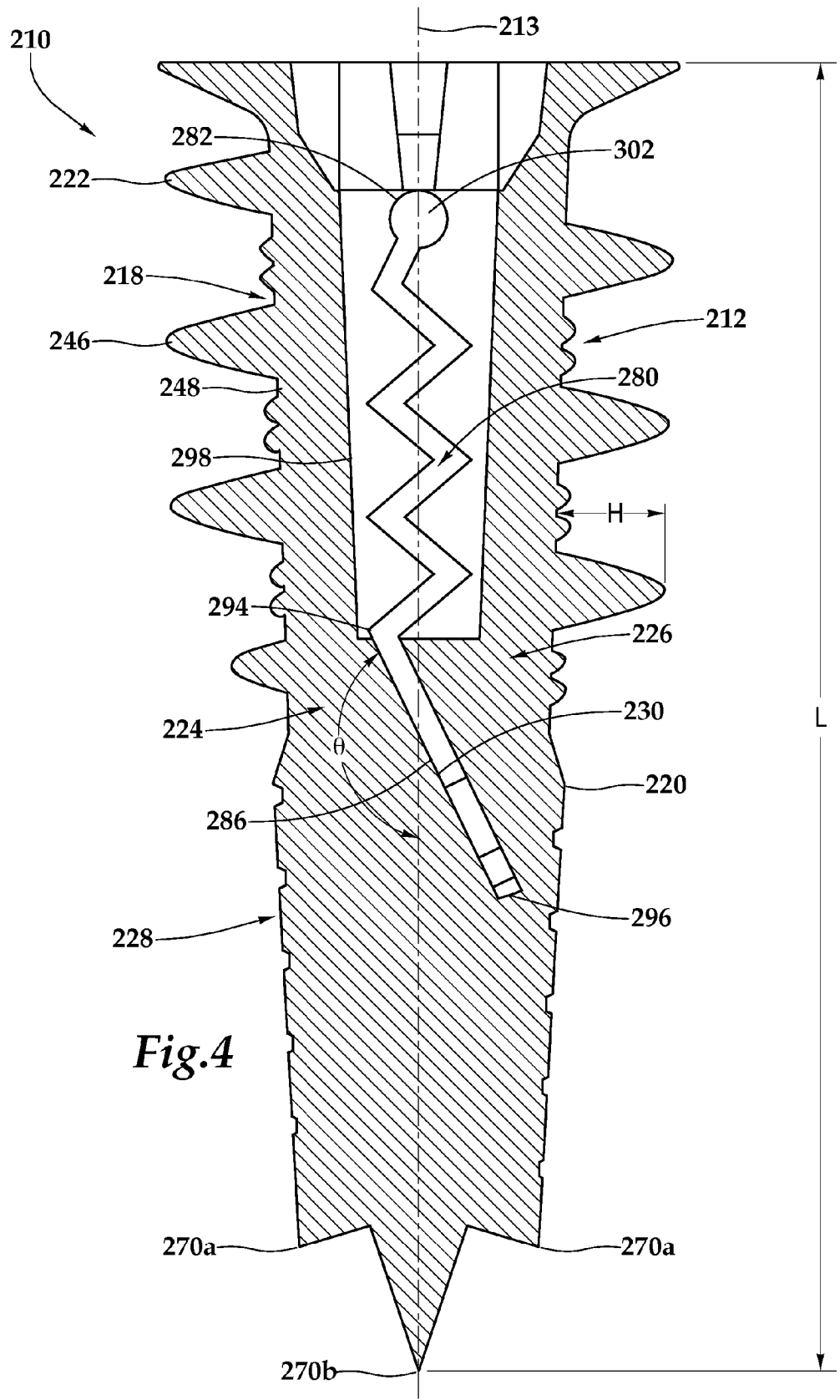
FIG. 4 is a sectional view of the self-drilling anchor in the drilling mode taken along line 4-4 in FIG. 2.

The description provided herein incorporates by reference the description provided in the commonly assigned U.S. patent application Ser. No. 11/290,212, filed one Nov. 30, 2005. In that application, certain characteristics of a desirable anchor were disclosed. These are shown in this application as well, but with different reference numerals, having either a 200 or 300 prefix, to help distinguish this case from previous ones, even though there may be intentional overlap of elements.

Whereas in a previous application, other dimensions were mentioned in regards to another embodiment, the embodiments presented in the current application may have differed in order to achieve increased pull-out strength.

Referring to FIGS. 1, 5 and 6, a self-drilling anchor 210 is shown for use in a friable material, such as drywall 201. Anchor 210 includes a body 212 having an axis 213, a flanged rear end 214 having torque transmitting surfaces 242, a drilling front end 216, an outer surface 220 with a thread 222 having a height sufficient to increase pullout strength disposed thereon, wherein the increases in pullout strength may be substantial compared to other prior art anchors, a first leg 224 and a second leg 226, wherein anchor 210 has a drilling mode wherein first leg 224 and second leg 226 form a generally cylindrical portion 218, first leg 224 has a generally rearward facing shoulder 230 angled obtusely with respect to axis 213, body 212 has an axial bore 232 for receiving an elongate mounting fastener 202, axial bore 232 extending substantially through flanged rear end 214 and leading to shoulder 230, first leg 224 and second leg 226 being demarcated from one another by at least one slit 280 beginning at a predetermined distance SD from flanged rear end 214 and extending at least partly through outer surface 220 and thread 222 of generally cylindrical portion 218, FIG. 1, and is adapted such that first leg 224 pivots apart from second leg 226 when elongate fastener 202 deflects generally rearward facing shoulder 230, FIGS. 5 & 6. First leg 224 and second leg 226 each have a thread 300a, 300b disposed thereon., threads 300a, 300b being generally aligned with thread 222 on the outer surface 220 of body 212.

Anchor 210 is for use in a friable material, such as drywall 201, for mounting an article 203 to drywall 201. Anchor 210 may be formed and is initially positioned in the drilling mode, as shown in FIG. 1, which allows anchor 210 to drill into drywall 201, and external thread 222 engages drywall 1 to hold anchor 210 in drywall 201 with increased pullout strength. After anchor 210 is installed, a fastener 202 is inserted through article 203 and into bore 232 of anchor 210 so that fastener 202 can support article 203. Fastener 202 pivots legs 224, 226 outwardly into the anchoring mode, as shown in FIGS. 5 and 6, so that anchor 210 has increased pullout strength. Anchor 210 provides stronger engagement with drywall 201 and higher pullout strength and sheer strength than fastener 202 alone.

The friable material may be one of several friable materials used in the construction industry wherein it is desired to mount an article 203 to the friable material in order to increase the amount of load that can be mounted to the friable material. An example of a friable material is gypsum based drywall 201, such as the gypsum drywall sold under the trademark SHEETROCK by United States Gypsum. Drywall 201 typically has a thickness T of ½ inch or ⅝ inch, but it can be obtained in other thicknesses, such as ⅜ inch.

Fastener 202 may have different lengths to accommodate different thicknesses AT of article 203. Preferably, fastener 202 is long enough to extend through article 203 and bore 232 so that fastener 202 engages shoulder 230 and pivots legs 224, 226 outwardly to wedge into drywall 201. Fastener 202 may also pivot second leg 226 outwardly to wedge into drywall 201. For example, for an anchor 210 having a length of about 1.67 inches, fastener 202 may have a length of between about 1 inch and about 2 inches, preferably between about 1¼ inches and about 1¾ inches, still more preferably about 1½ inches.

Anchor

Turning to FIG. 1, anchor 210 includes a body 212 with a flanged rear end 214 and a drilling front end 216 generally opposite flanged end 214, with a generally cylindrical central portion 218 between flanged end 214 and drilling end 216. Anchor body 212 has a wall 234 that surrounds a generally axial bore 232 for receiving fastener 202, wherein bore 232 has an elongated generally cylindrical portion.

Anchor 210 has an axial length L that is a combination of the length N of neck 260, length TL, of thread 222 and length DL of drilling tip 228 (described below). A shorter anchor 210 is preferred, so long as N, TL, and DL, are each long enough, as described below, because it is less expensive to manufacture, easier to handle and to keep stable during installation, and it has a shorter drive time so that a user can install a plurality of anchors 210 in a relatively short period of time with a minimum amount of effort. In one embodiment, anchor 210 has a length L of between about 1.25 inches and about 2 inches, preferably between about 1.45 inches and about 1.8 inches, still more preferably about 1.58 inches.

Bore 232 is sized to accommodate fastener 202 and may be sized to accommodate fasteners 207 of various lengths and sizes. Preferably, bore 232 has a diameter that is large enough to receive a #8 screw, or fasteners having a smaller diameter. However, bore 232 may also be sized to fit #6, #9, #10 or other sized fastener 202. Bore 232 extends through flanged end 214 tip to shoulder 230. In one embodiment, shown in FIG. 4, a portion 298 of bore 232 proximate shoulder 230 is tapered toward shoulder 230 to provide for better engagement between fastener 202 and legs 224, 226 so that legs 224, 226 are pivoted outwardly more effectively. Tapered portion 298 may taper at an angle with respect to axis 213 of between about 5° and about 25°, preferably between about 10° and about 20°, still more preferably about 15°, and tapered portion 298 may begin at an axial length away from shoulder 230 of between about 0.1 inches and about 0.3 inches, preferably between about 0.15 inches and about 0.17 inches, still more preferably about 0.16 inches.

Flanged end 214 of anchor body 212 includes a flange 238 having torque transmitting surfaces therein for being driven by a driver (not shown), such as surfaces 242 in a Phillips-type recess 240, which may be a Phillips Square Drive to minimize cam-out. Anchor 210 is preferably manually drivable by a hand-powered screwdriver, which may be driven by a Phillips screwdriver or the like, or by a power driver.

Continuing with FIGS. 1, 5 and 6, thread 222 is disposed on an outer surface 220 of central portion 218 and is provided for engagement with drywall 201 when anchor 210 is installed so that the load of article 203 will be supported by drywall 201. Thread 222 taps a mating thread 244 in drywall 201 so that an engagement between thread 222 and drywall 201 is accomplished. Thread 222 is preferably generally helical, and includes a crest 246 with a crest diameter C and a root 248 having a root diameter R, wherein the distance between crest 246 and root 248, or the thread height H, is relatively large to maximize the surface area of thread 222 encountered by drywall 201, increasing the pullout strength. In one embodiment, the diameter C of crest 246 is about twice the diameter R of root 248.

It has been found that engagement with paper 256 on the rear surface 254 of drywall 201 provides a substantial portion of the grip between anchor 210 and drywall 201, therefore it is preferable that the axial length TL (FIG. 2) of thread 222 be long enough so that at least about 1 turn of thread 222 is engaged behind drywall 201 so that thread 222 engages the paper 256 on rear drywall surface 254 when legs 224, 226 are pivoted outward from each other, see FIG. 6. In one embodiment, the axial length TL of thread 222 is between about 0.6 inches and about 1 inch, preferably between about 0.7 inches and about 0.8 inches, still more preferably about ¾ inch.

Turning to FIG. 2, the upper end 258 of thread 222 is spaced from flange 238 to form a neck 260 between flange 238 and thread end 258. Neck 260 allows the upper surface of flange 238 to seat at or below the level of drywall front surface 250, as shown in FIG. 5, because the discontinuation of thread 222 at neck 260 before reaching flange 238 creates a space in drywall mating thread 244, which allows compression of adjacent drywall 201 by flange 238. Also, neck 260 ensures that thread 222 is spaced away from paper 252 on front drywall surface 250, so that thread 222 does not engage paper 252 and twist it, creating an undesirable appearance at front drywall surface 250. Neck 260 can have a length N of between about 0.03 inch and about 0.1 inch, preferably about 0.07 inch.

Turning back to FIGS. 1 and 2, drilling end 216 is located generally opposite flanged end 214. A drilling tip 228 is connected to body at drilling end 216 to allow anchor 210 to drill through drywall 201 as anchor 210 is driven by a user so that a separate drilling step is not required.

Drilling tip 228 may be one of many configurations, such as the various tips shown in the figures of the parent application, Ser. No. 11/290,212, which has already been incorporated herein by reference. These include, but are not limited to, a generally spade-like tip shown in FIGS. 1-7 of the parent; a triple point configuration as shown in FIGS. 13-16 and 18-20 of the parent application; a triple-point "castle" configuration of cutting tips arranged around a gimlet point as shown in FIG. 17 of the parent application; or the modified gimlet drilling tip with radially outwardly extending wings as shown in FIG. 12 of the parent application. In addition, FIGS. 15 and 18 of the parent application illustrate a conical drill point/drilling tip 170a, while FIG. 16 illustrates a sharp drill point/drilling tip 170b.

The embodiment of FIGS. 1 & 2 of the present application show the triple point configuration 270 comprising two outer drilling points or tips 271a surrounding the center drilling point or tip 271b. When the anchor is rotated, this tri-point configuration clears out a hole for threading the outer diameter of the anchor into the drywall to eliminate drywall blistering. In this regard, in the embodiment shown, each of the outer points 271a also may have a sharp reaming or cutting edge 273 to further enhance this process. Each reaming or cutting edge 273 may further have a notched portion 274 running in a generally axial direction that also aids in reaming out a hole in drywall 201. This configuration also provides added stability during drilling. In addition, notched portion 274 may taper toward drilling tip 271a. Tapering may allow for easier expansion of the hole being drilled in drywall 201 and may result in improved cosmetic appearance of drywall 201.

Preferably, the axial length DL, of drilling tip 228 is at least as long as the thickness T of drywall 201, so that drilling tip 228 will complete its drilling before thread 222 begins to engage drywall 201. This is preferred because drilling into a material tends to advance axially through the material substantially slower than driving through the material with threading. It is preferred that the drilling of drywall 201 be complete before thread 222 engages drywall 201 so that thread 222 does not ream out a hole in drywall 201. In one embodiment, drilling tip 228 has a length DL of between about 0.6 inches and about 1 inch, preferably between about 0.7 inches and about 0.8 inch, still more preferably about ¾ inch.

Turning back to FIG. 1, anchor body 212 forks at eyelet 302 (described below) of slits 280, the center of which is spaced a predetermined distance SD from flanged end 214 into a first leg 224 and a second leg 226. First leg 224 may include generally rearward facing shoulder 230, which is angled obtusely outwardly with respect to axis 213, as shown in FIG. 4. In one embodiment, when anchor 210 is in the drilling mode, second leg 226 is nested behind first leg 224 so that second leg 226 does not interfere with the process of driving anchor 210 into drywall 201.

Continuing with FIG. 1 and turning to FIG. 4, if the selected spaced distance SD between eyelet 302 of each slit 280 and flanged end 214 is too small, first end 282 will be too close to flanged end 214, and legs 224, 226 will tend to be pivoted outwardly too far and too close to front drywall surface 250, causing damage to drywall 201, such as buckling, and premature pullout of anchor 210 and fastener 202. If the selected distance SD is too large, eyelet 302 will be too far from flanged end 214, and legs 224, 226 will not be pivoted outwardly far enough, so that legs 224, 226 will not be adequately engaged with drywall 201 and will not aid in increasing the pullout strength achieved by anchor 210. Eyelet 302 of slits 280 may be spaced a distance SD from flanged end 214 that is between about 4% and about 30%, preferably between about 10% and about 20%, still more preferably about 12% of the total length L of anchor 210. It may be desirable to position eyelet 302 at a predetermined depth within drywall 201, so that spaced distance SD may be between about 10% and about 75%, preferably between 30% and about 50%, still more preferably about 38% of the thickness T of drywall 201.

The selected distance SD may be a significant factor in determining the pullout strength of the anchor. Regardless of the type of drilling tip 228 used or the material from which anchor 210 is formed, pullout strength increases are observed when SD is between about 1/16 inch and about 3/8 inch. Anchor has been tested with SD at nominally about 0.063 inch, with positive results achieved. At this distance, drywall 201 may still be weaker than anchor 210 such that pullout failure may occur in the drywall 201 and not due to breaking of anchor 210. Preferably, the center of eyelet 302 may be spaced from flanged end 214 by a distance SD of between about 1/16 inch and about 3/8 inch, more preferably between about 3/20 inch and about 1/4 inch, still more preferably about 0.189 inch or about 3/16 inch.

In one embodiment, first end 282 of each slit 280 is rounded to avoid the formation of stress concentrations at first end 282, which would tend to crack or split anchor body 212 between first end 282 and flanged end 214 as legs 224, 226 are pivoted outwardly. Anchor 210 may also include an eyelet 302 at first end 282. Eyelet 302 may be generally circular, as shown in FIG. 1, ellipsoidal, or of other generally curved geometries. Preferably, eyelet 302 is larger than slit 280, so that legs 224, 226 can over-pivot slightly before body 212 begins to crack. In one embodiment, eyelet 202 has a diameter that is between about 1.5 and about 4, preferably between about 2 and about 3, still more preferably about 2.5 times larger than the width of each slit 80 when anchor 10 is in the drilling mode. In one embodiment, eyelet 102 has a diameter of about 0.05 inch, and slit has a width of about 0.02 inch.

In one embodiment, first leg 224 is demarcated from second leg 226 by a pair of slits 280 extending substantially through outer surface 220 of anchor wall 234 and through thread 222, wherein one slit 280 is on generally the opposite side of outer surface 220 from the other slit 280. Slits 280 are about 180° from each other on outer wall 234. In one embodiment, slits 280 split anchor wall 234 and thread 222, so that a portion 300a, 300b of thread 222 is on each leg 224, 226 (see FIGS. 5 & 6).

Slits 280 extend generally axially along body 212 from a first end 282 toward a second end 284. Body 212 forks along slits 280 into first leg 224 and second leg 226. Slits 280 may extend to a position proximate outer surface 220 so that there is a connection or land between first leg 224 and second leg 226 at second end 284 of slit 280, as shown in FIG. 1, but preferably slits 280 extend completely through wall 234 to outer surface 220 at second end 284, so that legs 224, 226 can more easily pivot apart when fastener 202 is driven through anchor 210.

In one embodiment, each slit 280 generally has a zig-zag shape that defines a plurality of crocodile-like interfacing teeth 290 on legs 224, 226. Each slit 280 includes a plurality of generally linear portions, wherein each portion is angled acutely with respect to its adjacent portions. In the embodiment shown in FIG. 1, a first linear portion 292a extends from second end 282 of slit 280 and is angled acutely with respect to anchor wall 234 so that first portion 292a extends rearwardly and laterally inwardly from anchor wall 234, a second portion 292b is angled acutely with respect to first portion 292a so that second portion 292b extends rearwardly but laterally in the opposite direction as first portion 292a, and a third portion 292c is angled acutely with respect to second portion 292b so that third portion 292c extends rearwardly but laterally in the opposite direction as second portion 292b, or laterally in the same direction as first portion 292a. In one embodiment, each portion 292a, 292b, 292c, etc. of zig-zag shaped slit 280 is angled from adjacent portions by an angle of between about 45° and about 110°, preferably between about 60° and about 95°, still more preferably about 80°. In one embodiment, first portions 292a of slits 280 define generally rearward facing shoulder 230 on first leg 224.

Continuing with the embodiment of FIG. 1, teeth 290 interlock together and interface when anchor 210 is in the drilling mode. Interlocked teeth 290 help stabilize anchor body 212 and prevent it from twisting or buckling as anchor 210 is driven into drywall 201, while still allowing legs 224, 226 to be pivoted apart and wedged into drywall 201. It is also believed that teeth 290 increase pullout by engaging with drywall 1 at outer surface 220 when anchor 210 is in the anchoring mode.

Teeth 290 also aid in the pullout strength of anchor 210 because teeth 290 can fit between adjacent threads 209 of fastener 202, as shown with tooth 290a in FIG. 6, so that teeth 290 engage fastener 202 and wedge it into place. In this way, teeth 290 act as a thread lock on both sides of fastener 202 which causes fastener 202 to be more tightly engaged with anchor 210, helping to block fastener 202 from pulling out of engagement with anchor 210. Fastener threads 209 increase pullout strength by engaging and pushing teeth 290 to further pivot legs 224, 226 outwardly to wedge into drywall 201.

Turning to FIGS. 5, and 6, first leg 224 includes a shoulder 230 which is generally rearward facing so that shoulder 230 is engaged by fastener 202 to pivot first leg 224 apart from second leg 226 as fastener 202 is driven though anchor 210. As first leg 224 is deflected by fastener 202, first leg 224 is wedged into drywall 201, providing a higher pullout strength than if first leg 224 were to remain unpivoted. Shoulder 230 is angled obtusely outwardly with respect to axis 213, so that fastener tip 209 is able to slide along shoulder 230 and deflect first leg 224 so it pivots laterally away from fastener 202. In the embodiment of FIG. 1, shoulder 230 extends from a rearmost and innermost end 294 laterally outwardly across bore 232 to a forwardmost and outermost end 296 at second end 284 of slits 280. Shoulder 230 ensures that fastener 202 does not screw into drilling tip 228, which would prevent first leg 224 from being pivoted.

The axial length between flanged end 214 and shoulder 230 may be selected to optimize the pivoting of legs 224, 226 to produce the highest pullout strength. The axial length between flanged end 214 and shoulder 230 may be between about 1/2 inch and about 3/4 inch, preferably between about 9/16 inch and about 11/16 inch, still more preferably about 5/8 inch, however, the axial length between flanged end 214 and shoulder may also be less than about 1/2 inch.

In one embodiment, shoulder 230 is a surface that is generally angled obtusely outwardly with respect to anchor axis 213 so that shoulder 230 extends forwardly and laterally outwardly. In one embodiment, shoulder 230 extends from one lateral side of axis 213 substantially across bore 232 to the other side of axis 213 so that as fastener 202 is driven, tip 208 contacts an angled portion of shoulder 230 to ensure that tip 208 slides along shoulder 230 to deflect and pivot first leg 224 laterally outwardly.

As the distance SD is altered, the angle, θ, that shoulder 230 makes relative to axis 213 may be altered to adjust the extent that legs 224, 226 pivot outwardly. This angle controls the degree to which legs 224, 226 will separate and, if poorly chosen, may lead to harmful cracking of anchor 210 near first end 282. In one embodiment, shoulder 230 is generally planar and forms an angle θ with respect to axis 213 when anchor is in the drilling mode (FIGS. 1 and 4) of between about 100° and about 170°, preferably between about 130° and about 160°, still more preferably about 152°. Shoulder 230 should be smooth and substantially free of defects so that fastener tip 208 easily slides along shoulder 230 rather than catching or sticking, which might cause fastener 202 to screw into first leg 224.

Continuing with FIG. 5, second leg 226 is also deflected by fastener 202 so that second leg 226 also is wedged into drywall 201 to increase the pullout strength of anchor 210. In one embodiment, shown in FIG. 4, a portion 298 of anchor bore 232 proximate drilling end 216 is tapered toward drilling tip 228 so that as fastener 202 is driven through bore 232, it engages tapered portion 298 to more effectively deflect legs 224, 226 laterally outwardly away from fastener 202.

As legs 224, 226 are pivoted away from one another by fastener 202, they engage and are wedged into drywall 201, as shown in FIG. 6. As legs 224, 226 are wedged into drywall 201, anchor 210 becomes more resistant to pullout. Preferably, a portion 300a, 300b of thread 222 on each leg 224, 226 is also wedged into back drywall surface 254, so that the thread portions 300a, 300b can act as barbs that more tightly engage paper 256 on back drywall surface 254 to provide even stronger resistance to pullout. Each leg 224, 226 may deflect between about 5 degrees and about 25 degrees, more preferably between about 10 degrees and about 20 degrees.

Surprisingly, it has been found that anchor 210, with legs 224, 226 that are deflected outwardly by fastener 202 and a selected distance SD that is between about 1/16 inch and about 3/8 inch increases the pullout strength anchor 210 can achieve in drywall 201. An anchor having similar features, but with SD larger than the preferred range has been known to achieve a maximum pullout strength of about 65-70 pounds. An anchor having similar length, thread height, and root diameter dimensions, but without SD in the about 1/16 inch to about 3/8 inch range and without shoulder 230 that is engaged by fastener 202 so that legs 224, 226 are pivoted outwardly, has been known to achieve a maximum pullout strength of about 50-60 pounds. It has been found through experimentation that, when SD is about 3/16 inch and shoulder 230 is angled at about 152 degrees relative to axis 213, anchor 210 achieves consistent pullout strength results with pullout strengths as high as about 116 pounds and an average pullout strength in experiments of about 115 pounds.

In another embodiment, legs 224, 226 are demarcated from each other by at least one slit 280. Slit 280 may extend in a generally axial direction and may extend to a forward end proximate drilling tip 228 and drilling tip may comprise a land joining the legs 224, 226. In this embodiment, legs 224, 226 may be spread apart when fastener 202 is advanced through axial bore 232 because fastener 202 may have a crest diameter 209 larger than a diameter of bore 232 or because bore 232 may be tapered with respect to axis 213. Alternatively, slit 280 may extend to a point intermediate eyelet 302 and drilling front end 216 to a generally rearward facing shoulder 230 angled generally normal to axis 213.

Method of Use

The method by which anchor 210 is used is the same as for the anchor in the parent application, Ser. No. 11/290,212, already incorporated herein by reference.

Advantages of the invention include greater pullout strength than current products, and greater shear strength in comparison to size. Additionally, the strength increases that are observed may result regardless of the material from which the anchor is made or the type of drilling tip used. The invention is cost competitive due to this size/strength advantage and its one-piece construction. Other advantages include the self-drilling feature, low installation torque for mounting a screw, no blistering under the drywall paper around the head, more stability during drilling, excellent fit with all types of screwdriver Phillips size, head seats flush with the drywall, does not break during installation in drywall, and a robust Phillips recess that does not crack around the outer diameter. Moreover, it has been found that holding performance of the anchor may be somewhat independent of the torque required to insert a fastener into the anchor. As such, bore may be sized and shaped to decrease the torque required to install the fastener, which may allow for insertion and removal of the fastener without movement of the anchor relative to the drywall.

The self-drilling anchor of the present invention provides an apparatus that is easy to install so that it requires no additional steps over a traditional self-drilling anchor, while providing increased pullout strength comparable to toggle bolts or other more complicated apparatus. This provides a significant advantage to the user, in that the method of installing is essentially identical to self-drilling anchor, but still provides high pullout strength associated with harder-to-install toggle bolts, without adding difficulty to the installation.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

What is claimed is:

1. A self-drilling anchor for use in a friable material, comprising:
   a body having an axis, a flanged rear end having torque transmitting surfaces, a drilling front end, an outer surface with a thread having a height sufficient to increase pullout strength disposed thereon, a first leg and a second leg;
   said self-drilling anchor having a drilling mode wherein said first leg and said second leg form a generally cylindrical portion, said first leg has a generally rearward facing shoulder angled obtusely with respect to said axis and outwardly toward the drilling front end, said body has an axial bore for receiving an elongate fastener, said axial bore having a sidewall and extending substantially through said flanged rear end and leading axially uninterruptedly to said generally rearward facing shoulder, said first leg and said second leg are demarcated from one another by at least one slit beginning at a predetermined distance from said flanged rear end and extending at least partly through said outer surface and said thread of said generally cylindrical portion;
   wherein said axial bore has an end surface between said sidewall and said generally rearward facing shoulder;
   wherein said self-drilling anchor is adapted such that said first leg pivots apart from said second leg when said elongate fastener deflects said generally rearward facing shoulder; and
   wherein said predetermined distance is between about 1/16 inch and about 3/8 inch and said generally rearward facing shoulder is angled between about 100° and about 170° with respect to said axis.

2. A self-drilling anchor according to claim 1, wherein said predetermined distance is further between about 3/20 inch and about 1/4 inch.

3. A self-drilling anchor according to claim 1, wherein said predetermined distance is about 3/16 inch.

4. A self-drilling anchor according to claim 1, wherein said predetermined distance is further between about 10 percent and about 75 percent of a thickness of said friable material.

5. A self-drilling anchor according to claim 1, wherein said predetermined distance is further between about 30 percent and about 50 percent of a thickness of said friable material.

6. A self-drilling anchor according to claim 1, wherein said predetermined distance is about equal to 38 percent of a thickness of said friable material.

7. A self-drilling anchor according to claim 1, wherein said generally rearward facing shoulder is angled between about 130° and about 160° with respect to said axis.

8. A self-drilling anchor according to claim 1, wherein said generally rearward facing shoulder is angled about 152° with respect to said axis.

9. A self-drilling anchor according to claim 1, further comprising a pair of slits, said slits being on generally opposite sides of said outer surface.

10. A self-drilling anchor according to claim 9, wherein said pair of slits has a generally zig-zag shape defining interfacing teeth on said legs.

11. A self-drilling anchor according to claim 1, further comprising an unthreaded neck proximate said flanged rear end.

12. A self-drilling anchor according to claim 1, wherein said first leg and said second leg each have a thread disposed thereon, said thread generally aligned with said thread on said outer surface of said body.

13. A self-drilling anchor according to claim 1, wherein about 1½ turns of said thread on said outer surface of said body extend beyond an inner surface of said friable material when said anchor is in said driving mode and said flanged rear end contacts an outer surface of said friable material.

14. A self-drilling anchor according to claim 1, wherein said drilling front end has an axially centered point and at least two surrounding points, each surrounding point having a reamer edge surface.

15. A self-drilling anchor for use in a friable material, comprising:
   a body having an axis, a flanged rear end having torque transmitting surfaces, a drilling front end, an outer surface with a thread having a height sufficient to increase pullout strength disposed thereon, a first leg and a second leg;
   said self-drilling anchor having a drilling mode wherein said first leg and said second leg form a generally cylindrical portion, said first leg has a generally rearward facing shoulder angled obtusely with respect to said axis and outwardly toward the drilling front end, said body has an axial bore having a sidewall for receiving an elongate fastener, said axial bore extending substantially through said flanged rear end and said generally cylindrical portion and leading to said generally rearward facing shoulder, said first leg and said second leg are demarcated from one another by a pair of slits beginning at a predetermined distance from said flanged rear end and extending at least partly through said outer surface and said thread of said generally cylindrical portion, said slits being on generally opposite sides of said outer surface;
   wherein said axial bore has an end surface between said sidewall and said generally rearward facing shoulder;
   wherein said self-drilling anchor is adapted such that said first leg pivots apart from said second leg when said elongate fastener deflects said generally rearward facing shoulder;
   wherein said predetermined distance is selected and said generally rearward facing shoulder is angled with respect to said axis to increase pullout strength of said anchor.

16. A self-drilling anchor for use in a friable material, comprising:
   a body having an axis, a flanged rear end having torque transmitting surfaces, a drilling front end, an outer surface with a thread having a height sufficient to increase pullout strength disposed thereon, a first leg and a second leg;
   said self-drilling anchor having a drilling mode wherein said first leg and said second leg form a generally cylindrical portion, said first leg has a generally rearward facing shoulder angled obtusely with respect to said axis and outwardly toward the drilling front end, said body has an axial bore having a sidewall for receiving an elongate fastener, said axial bore extending substantially through said flanged rear end and said generally cylindrical portion and leading to said generally rearward facing shoulder, wherein said axial bore tapers from a first diameter to a second diameter smaller than said first diameter as it extends from said flanged end to said generally rearward facing shoulder, said first leg and said second leg are demarcated from one another by a pair of zig-zag slits beginning at a predetermined distance from said flanged rear end and extending at least partly through said outer surface and said thread of said generally cylindrical portion, said slits being on generally opposite sides of said outer surface;
   wherein said axial bore has an end surface between said sidewall and said generally rearward facing shoulder;
   wherein said self-drilling anchor is adapted such that said first leg pivots apart from said second leg when said elongate fastener deflects said generally rearward facing shoulder;
   wherein said predetermined distance is between about 1/16 inch and about 3/8 inch.

17. A self-drilling anchor according to claim 16, wherein said predetermined distance is further between about 10 percent and about 75 percent of a thickness of said friable material.

18. A self-drilling anchor according to claim 16, wherein said predetermined distance is further between about 30 percent and about 50 percent of a thickness of said friable material.

19. A self-drilling anchor according to claim 16, wherein said predetermined distance is about equal to 38 percent of a thickness of said friable material.

* * * * *